(12) United States Patent
Sakaeda

(10) Patent No.: US 8,893,045 B2
(45) Date of Patent: Nov. 18, 2014

(54) DISPLAY CONTROLLER, DISPLAY CONTROL METHOD AND PROGRAM

(75) Inventor: Junichi Sakaeda, Kanagawa (JP)

(73) Assignee: Sony Corporation, Tokyo (JP)

(*) Notice: Subject to any disclaimer, the term of this patent is extended or adjusted under 35 U.S.C. 154(b) by 119 days.

(21) Appl. No.: 13/558,783

(22) Filed: Jul. 26, 2012

(65) Prior Publication Data

US 2013/0031513 A1    Jan. 31, 2013

(30) Foreign Application Priority Data

Jul. 29, 2011  (JP) ................................ 2011-166544

(51) Int. Cl.
```
G06F 3/048    (2013.01)
H04L 29/08    (2006.01)
G06Q 30/00    (2012.01)
G06F 9/44     (2006.01)
```

(52) U.S. Cl.
CPC .............. *G06F 9/4443* (2013.01); *H04L 67/00* (2013.01); *G06Q 30/00* (2013.01)
USPC ............................ 715/835; 715/825; 715/844

(58) Field of Classification Search
USPC ......................................... 715/835, 825, 844
See application file for complete search history.

(56) References Cited

U.S. PATENT DOCUMENTS

| | | | |
|---|---|---|---|
| 7,587,411 B2* | 9/2009 | De Vorchik et al. .................. 1/1 |
| 7,634,740 B2* | 12/2009 | Enomoto et al. ............. 715/810 |
| 7,788,695 B2* | 8/2010 | Walter et al. .................... 725/97 |
| 8,056,113 B2* | 11/2011 | Balasubramanian et al. 725/152 |
| 8,103,969 B2* | 1/2012 | Gupta et al. .................. 715/825 |
| 8,228,435 B2* | 7/2012 | Yi ................................. 348/570 |
| 8,250,604 B2* | 8/2012 | Unger et al. ..................... 725/44 |
| RE43,751 E * | 10/2012 | Tange ........................... 709/217 |
| 8,321,888 B2* | 11/2012 | Epstein et al. .................. 725/32 |
| 8,384,672 B2* | 2/2013 | Sakai et al. .................... 345/169 |
| 8,488,067 B2* | 7/2013 | Candelore ..................... 348/734 |
| 8,661,485 B2* | 2/2014 | Walter et al. .................... 725/97 |
| 8,700,987 B2* | 4/2014 | Spalink ......................... 715/232 |
| 2007/0130211 A1 | 6/2007 | Lee |
| 2009/0065566 A1 | 3/2009 | Lee et al. |
| 2009/0204321 A1 | 8/2009 | Shinohara et al. |
| 2010/0241996 A1* | 9/2010 | Ho et al. ........................ 715/841 |
| 2012/0102117 A1* | 4/2012 | Morotomi .................... 709/204 |
| 2013/0031513 A1* | 1/2013 | Sakaeda ....................... 715/835 |

(Continued)

FOREIGN PATENT DOCUMENTS

| | | |
|---|---|---|
| EP | 1 764 731 A1 | 3/2007 |
| EP | 2 315 172 A1 | 4/2011 |
| JP | 10-229508 | 8/1998 |

OTHER PUBLICATIONS

Extended European Search Report issued Mar. 5, 2013 in Patent Application No. 12177231.3.

*Primary Examiner* — David Phantana Angkool
(74) *Attorney, Agent, or Firm* — Oblon, Spivak, McClelland, Maier & Neustadt, L.L.P.

(57) ABSTRACT

An information processing apparatus that acquires first data from a first server connected to the information processing apparatus via a network; generates a first menu based on the first data; controls a display to display the first menu; acquires second data from a second server connected to the information processing apparatus via a network based on a received input corresponding to the first menu; generates a second menu based on the second data; and controls the display to display the second menu.

20 Claims, 18 Drawing Sheets

(56) References Cited

U.S. PATENT DOCUMENTS

| | | | |
|---|---|---|---|
| 2014/0095964 A1* | 4/2014 | Mayblum et al. | 715/201 |
| 2014/0096032 A1* | 4/2014 | Mayblum et al. | 715/752 |
| 2014/0136979 A1* | 5/2014 | Morotomi | 715/716 |

* cited by examiner

F I G . 1
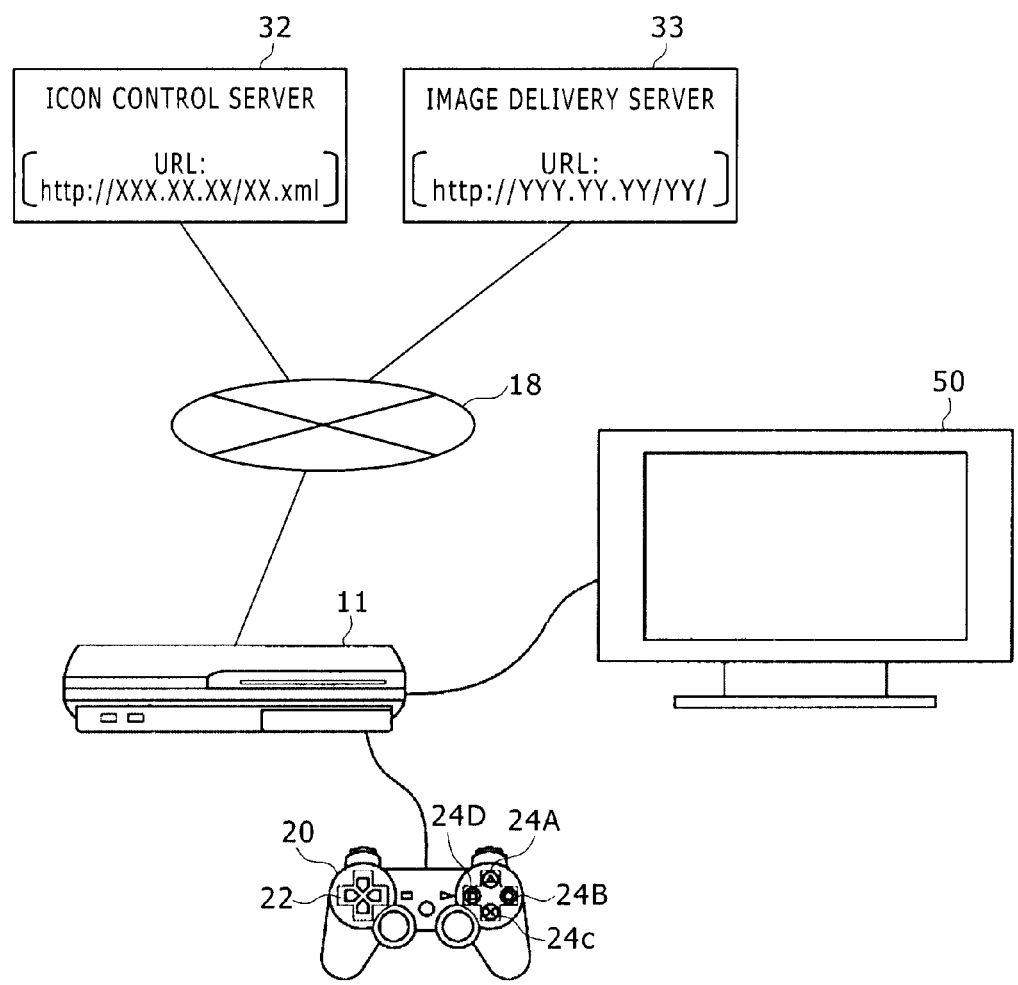

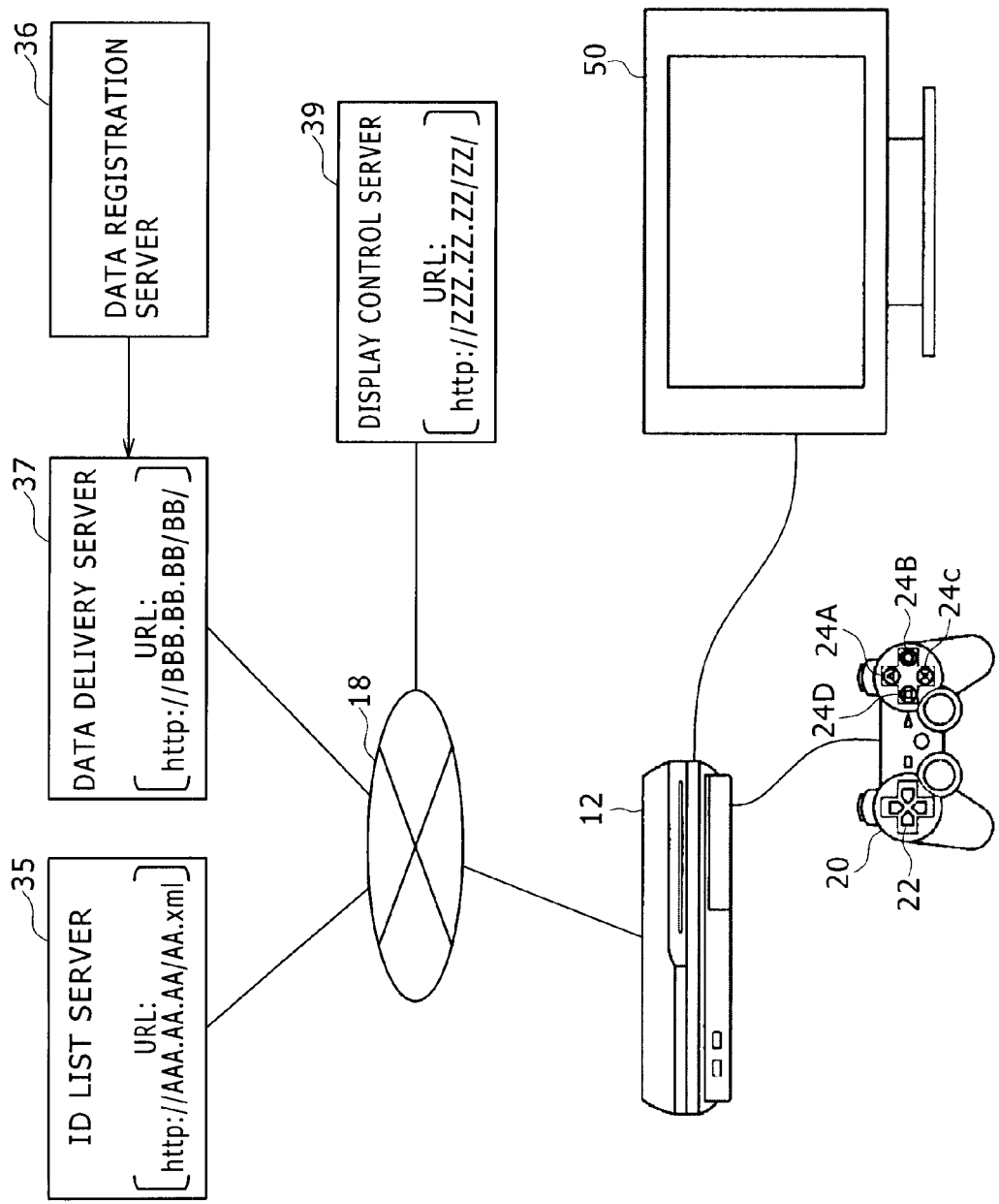

FIG. 8

```
48
<list lastupdate="2011/6/30">
<image ext="png" size="845" validdate="2099/12/31" priority="1">10001</image>      D1
<image ext="png" size="678" validdate="2012/12/31" priority="101">10002</image>    D2
<video ext="mp4" size="9710023345" validdate="2011/12/31" priority="2">22304</video>   D3
<video ext="mp4" size="6232323345" validdate="2011/12/31" priority="102">22305</video> D4
<audio ext="mp3" size="728344" validdate="2011/12/31" priority="3">32045</audio>   D5
<audio ext="mp3" size="839505" validdate="2011/12/31" priority="200">39345</audio> D6
  :
</list>
```

FIG.10

```
When the setting for using online data is ON
⟨storedisplay use="on"lastupdate="2011/7/1"⟩
    ⟨image⟩10002⟨/image⟩
    ⟨movie⟩22304⟨/movie⟩
    ⟨link⟩
        ⟨description⟩This is Wonderful Game⟨/description⟩
        ⟨linkid⟩1031⟨/linkid⟩
    ⟨/link⟩
⟨/storedisplay⟩
```

DISPLAY CONTROLLER, DISPLAY CONTROL METHOD AND PROGRAM

CROSS REFERENCE TO RELATED APPLICATION

This application claims the benefit of priority under 35 U.S.C. §119 to Japanese Priority Patent Application JP 2011-66544 filed in the Japan Patent Office on Jul. 29, 2011, the entire contents of which are hereby incorporated by reference.

BACKGROUND

The present disclosure relates to a display controller, display control method and program for providing improved ease of use for users in relation to the use of icon images.

Recent years have seen a proliferation of various information processors such as mobile phones, gaming machines and PCs (Personal Computers). Such information processors generally display icon images of executable functions and applications and activate the function or application appropriate to the icon image selected by the user.

For example, in a case where an information processor displays a store icon indicating a commercial transaction site on a network, the user can cause the information processor to access the top page of the commercial transaction site by selecting this store icon. Incidentally, concerning icon displaying, Japanese Patent Laid-Open No. Hei 10-229508 discloses a technique that changes the display content of an icon image according to the circumstances.

SUMMARY

However, if the access destination from each of the icon images is uniquely specified as described above, it would be inconvenient for the user. For example, if the top page of the commercial transaction site is specified as the destination accessed by selecting the store icon as described above, it may be troublesome for the user because it necessitates him or her to proceed from the top page of the commercial transaction site to the individual page of the desired piece of merchandise.

With this in view, there is a need for a new and improved display controller, display control method and program adapted to provide improved ease of use for users in relation to the use of icon images.

According to one embodiment of the present disclosure, there is provided an information processing apparatus that acquires first data from a first server connected to the information processing apparatus via a network; generates a first menu based on the first data; controls a display to display the first menu; acquires second data from a second server connected to the information processing apparatus via a network based on a received input corresponding to the first menu; generates a second menu based on the second data; and controls the display to display the second menu.

According to another exemplary embodiment, the disclosure is directed to a method performed by an information processing apparatus. The method comprising acquiring first data from a first server connected to the information processing apparatus via a network; generating a first menu based on the first data; controlling a display to display the first menu; acquiring second data from a second server connected to the information processing apparatus via a network based on a received input corresponding to the first menu; generating a second menu based on the second data; and controlling the display to display the second menu.

According to another exemplary embodiment, the disclosure is directed to a non-transitory computer-readable medium including computer program instructions, which when executed by an information processing apparatus, cause the information processing apparatus to perform a method. The method comprising acquiring first data from a first server connected to the information processing apparatus via a network; generating a first menu based on the first data; controlling a display to display the first menu; acquiring second data from a second server connected to the information processing apparatus via a network based on a received input corresponding to the first menu; generating a second menu based on the second data; and controlling the display to display the second menu.

As described above, the present disclosure provides improved ease of use for users in relation to the use of icon images.

BRIEF DESCRIPTION OF THE DRAWINGS

FIG. 1 is an explanatory diagram illustrating the overall configuration of a display control system according to a first embodiment of the present disclosure;

FIG. 5 is an explanatory diagram illustrating a specific example of a menu screen when the setting for using online icons is ON;

FIG. 7 is an explanatory diagram illustrating the overall configuration of a display control system according to a second embodiment of the present disclosure;

FIG. 8 is an explanatory diagram illustrating a specific example of an ID list possessed by an ID list server;

FIG. 10 is an explanatory diagram illustrating a specific example of a script acquired from a display control server when the setting for using online data is ON;

DETAILED DESCRIPTION OF THE PREFERRED EMBODIMENTS

Figure 2:
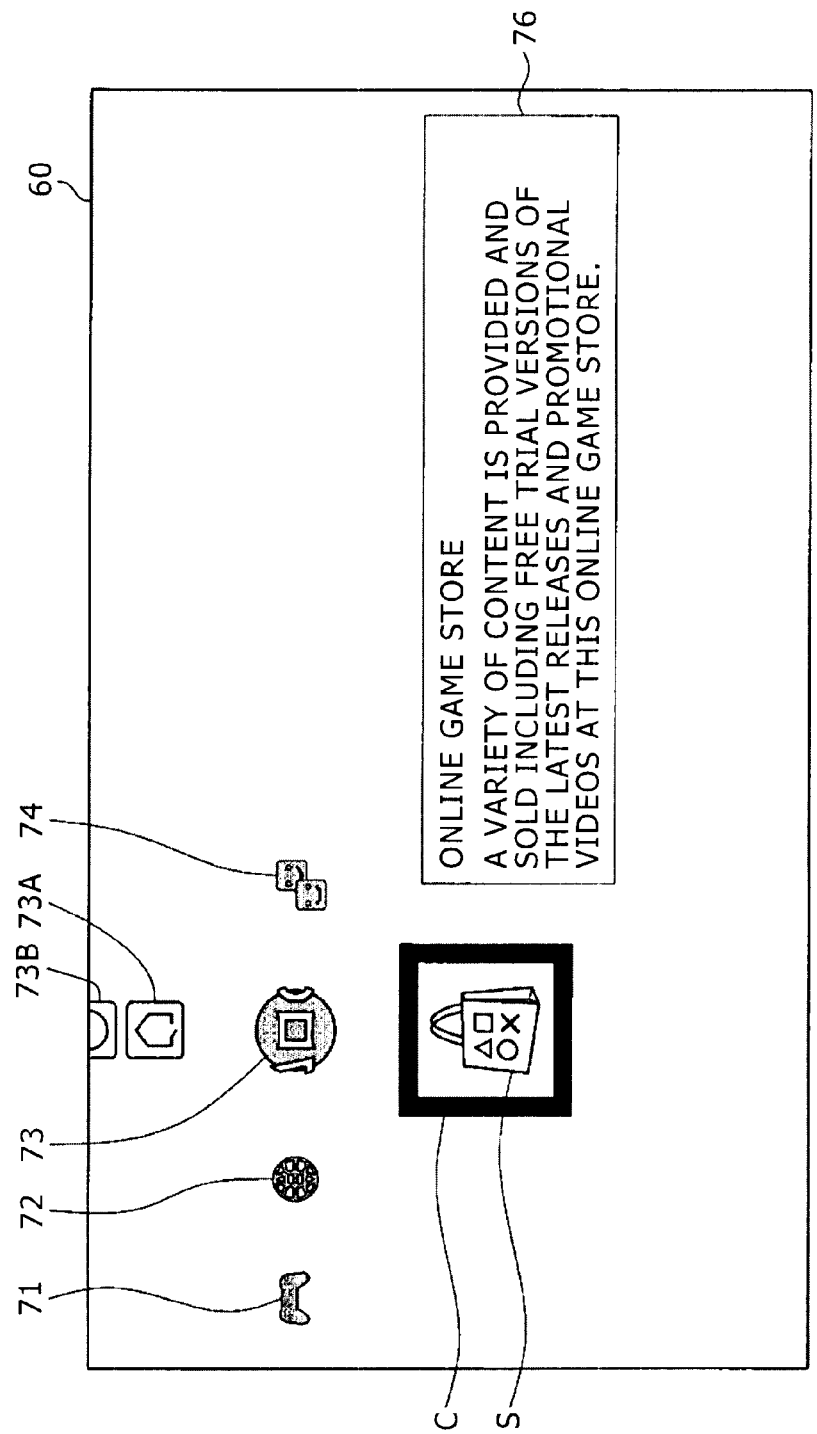
FIG. 2 is an explanatory diagram illustrating a specific example of a menu screen when the setting for using online icons is OFF.

A detailed description will be given below of preferred embodiments of the present disclosure with reference to the accompanying drawings. In the present specification and drawings, the constituent elements having substantially the same functional configuration are denoted by the same reference numeral to omit redundant description thereof.

On the other hand, in the present specification and drawings, a plurality of constituent elements having substantially the same functional configuration may be differentiated one from the other by different alphabets appended to the same reference numeral. Meanwhile, when it is unnecessary to differentiate a plurality of constituent elements having substantially the same functional configuration one from the other, those constituent elements are denoted by the same reference numeral only.

Further, a description will be given below of the present disclosure in the following order:
1. First Embodiment
2. Second Embodiment
3. Third Embodiment
4. Conclusion

1. FIRST EMBODIMENT

The first embodiment of the present disclosure relates to a display controller operable to replace an icon image on a menu screen displayed by a display device with an image specified by a network. For example, the display controller according to the first embodiment can replace a store icon adapted to access an online game store on a network with an image of a specific piece of merchandise specified by the network. In this case, it is possible to arouse the interest of users in the specific piece of merchandise and promote the sales of this piece of merchandise. A detailed description will be given below of the first embodiment of the present disclosure.

(System Configuration of the First Embodiment)

FIG. 1 is an explanatory diagram illustrating the overall configuration of a display control system according to the first embodiment of the present disclosure. As illustrated in FIG. 1, the display control system according to the first embodiment includes a display controller 11, controller 20, icon control server 32, image delivery server 33 and display device 50. Further, the display controller 11, icon control server 32 and image delivery server 33 are connected to each other via a network 18.

Incidentally, the network 18 is a wired or wireless channel for information transmitted from the devices connected to the network 18. For example, the network 18 may include public networks such as the Internet, telephone network and satellite communication network and various LANs (Local Area Networks) and WANs (Wide Area Networks) such as Ethernet (registered trademark). Further, the network 18 may include private networks such as IP-VPN (Internet Protocol-Virtual Private Network).

The display controller 11 according to the first embodiment connected to the network 18 generates a variety of display screens and supplies the generated display screens to the display device 50. For example, the display controller 11 generates a menu screen including a plurality of icon images and supplies this menu screen to the display device 50. Here, the display controller 11 according to the present embodiment can use an icon image specified by the icon control server 32 as a store icon included in the menu screen as described in detail later.

It should be noted that although a home gaming machine is shown as an example of the display controller 11 in FIG. 1, the display controller 11 is not limited to a home gaming machine. The same controller 11 may be, for example, an information processor such as a PC (Personal Computer), home video processor (e.g., DVD recorder or video deck), PDA (Personal Digital Assistant) or home electronic appliance. Alternatively, the display controller 11 may be an information processor such as a smartphone, mobile phone, PHS (Personal Handyphone System), portable music player, portable video processor or portable gaming machine.

The controller 20 is a user interface playing the functions of a user operation section. As illustrated in FIG. 1, the controller 20 has operation buttons such as a cross key 20, triangle button 24A, circle button 24B, x-shaped cross button 24C and square button 24D. The user can control the operation of the display controller 11 by operating this controller 20.

It should be noted that although FIG. 1 shows the controller 20 of a home gaming machine as an example of the user operation section, the user operation section is not limited to the controller 20. Instead, the user operation section may be a mouse, keyboard, touch panel, touch pad, switch, lever or dial, or a remote controller that sends a radio signal such as infrared rays.

The icon control server 32 is a display control server adapted to specify an icon image used as a store icon included in a menu screen. The same server 32 has a fixed URL such as "http://XXX.XX.XX/XX.xml" as illustrated in FIG. 1, thus allowing the display controller 11 to access the icon control server 32 in accordance with this fixed URL. It should be noted that although an example will be described in the present specification in which the icon control server 32 specifies a store icon, the same server 32 may specify an image used as any of a variety of icons other than a store icon.

The image delivery server 33 stores a variety of icon images and delivers the icon image requested by the display controller 11 to the same controller 11. The image delivery server 33 has a fixed URL such as "http://YYY.YY.YY/YY" as illustrated in FIG. 1, and each of the stored icon images is assigned a URL obtained by appending the fixed URL with a parameter specific to the icon image.

The display device 50 displays a display screen supplied from the display controller 11. For example, the display device 50 displays a menu screen including a plurality of icons. A description will be given below of a specific example of a menu screen according to the first embodiment when the setting for using online icons is OFF with reference to FIG. 2.

FIG. 2 is an explanatory diagram illustrating a specific example of a menu screen 60 when the setting for using online icons is OFF. As illustrated in FIG. 2, the menu screen 60 includes icon images that are arranged in the horizontal direction and those arranged in the vertical direction. More specifically, a game list icon 71, network browser icon 72, game network icon 73 and friend information icon 74 are arranged in the horizontal direction. On the other hand, a service icon 73A, latest information icon 73B and store icon S are arranged in the vertical direction intersecting the game network icon 73. The store icon S is used to access an online game store, i.e., a commercial transaction site on the network. Further, as the store icon S is focused by positioning a cursor C over the same icon S, a guide display 76 appears on the menu screen 60 to introduce the online game store as illustrated in FIG. 2.

Meanwhile, when the setting for using online icons is ON, the first embodiment of the present disclosure can replace the store icon S included in the menu screen 60 as appropriate. A more detailed description will be given below of the display controller 11, icon control server 32, image delivery server 33 and so on adapted to achieve the above action and effect.

(Configuration of the Display Controller According to the First Embodiment)

Figure 3:
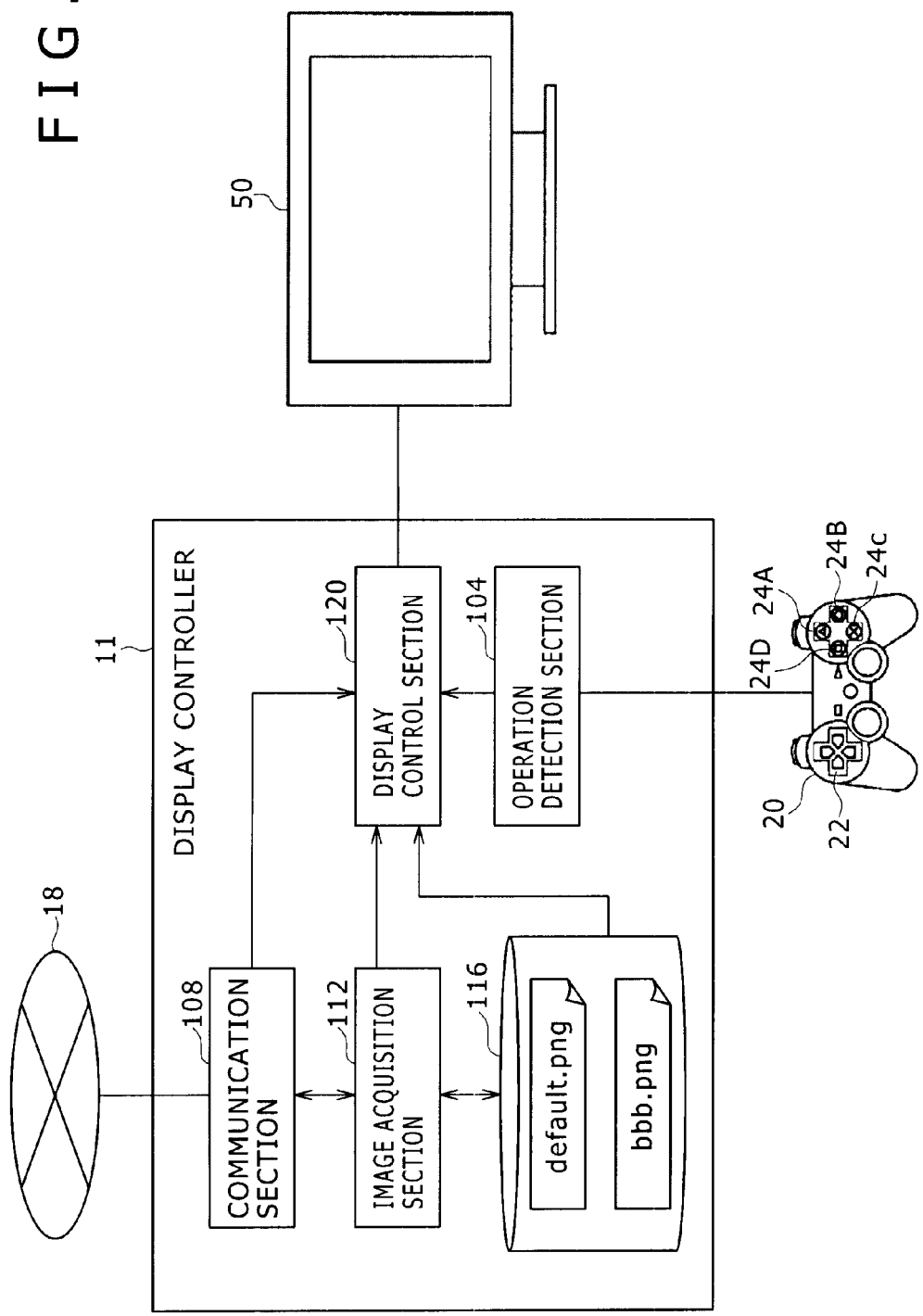
FIG. 3 is a functional block diagram illustrating the configuration of a display controller according to the first embodiment.

FIG. 3 is a functional block diagram illustrating the configuration of the display controller 11 according to the first embodiment. As illustrated in FIG. 3, the display controller 11 according to the first embodiment includes an operation detection section 104, communication section 108, image acquisition section 112, storage section 116 and display control section 120.

The operation detection section 104 detects a user operation performed on the controller 20 based on the operation signal supplied from the controller 20. Then, the operation detection section 104 supplies the detection result of the user operation, for example, to the display control section 120.

The communication section 108 communicates with the network nodes such as the icon control server 32 and image delivery server 33 via the network 18. For example, the communication section 108 checks the setting for using online icons by accessing the icon control server 32. Here, if the setting for using online icons is OFF, the communication section 108 acquires a script such as <onlineicon use="off"/> from the icon control server 32. On the other hand, if the setting for using online icons is ON, the communication section 108 acquires a script as shown below that includes the URL of the icon image to be used.

Example of a Script

```
<onlineicon use="on"/>
http://YYY.YY.YY/YY/aaa.png
</onlineicon>
```

Incidentally, the communication section 108 may check the setting for using online icons by accessing the icon control server 32 when the display control section 120 displays a menu screen or at predetermined intervals.

The image acquisition section 112 acquires an online icon image from the image delivery server 33 via the communication section 108. More specifically, if the setting for using online icons is ON, and if the online icon image specified by the icon control server 32 is not stored in the storage section 116, the image acquisition section 112 acquires the online icon image from the image delivery server 33 based on the URL indicated by the above script.

Figure 4:
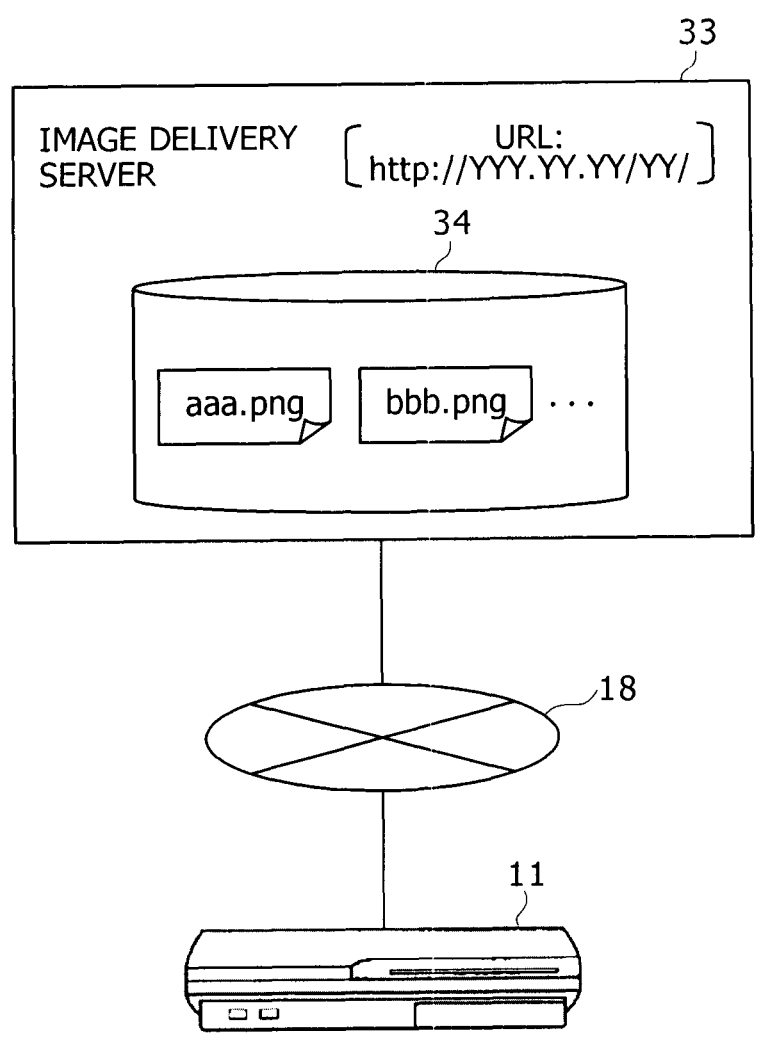
FIG. 4 is an explanatory diagram illustrating the configuration of an image delivery server.

Incidentally, the image delivery server 33 has an icon image DB 34 adapted to store a plurality of online icon images as illustrated in FIG. 4. Further, each icon image is assigned a URL obtained by appending the fixed URL of the image delivery server 33 with a parameter specific to the online icon image. For example, a URL "http://YYY.YY.YY/YY/aaa.png" is assigned to the online icon image "aaa.png." This makes it possible for the image acquisition section 112 to acquire an online icon image based on the URL indicated by the script acquired from the icon control server 32 as described above.

The storage section 116 stores icon images. In the example shown in FIG. 3, the storage section 116 stores a default store icon "default.png" and an online icon image "bbb.png." However, the same section 116 does not store the online icon image "aaa.png." Therefore, if the icon control server 32 specifies the online icon image "aaa.png" for use as a store icon as with the above script, the image acquisition section 112 acquires the online icon image "aaa.png" by accessing the image delivery server 33.

The storage section 116 may be a storage medium such as a non-volatile memory, magnetic disc, optical disc or MO (Magneto Optical) disc. Among non-volatile memories are EEPROM (Electrically Erasable Programmable Read-Only Memory) and EPROM (Erasable Programmable ROM). Further, among magnetic discs are harddisk and disk-type magnetic substance disk. Still further, among optical discs are CD (Compact Disc), DVD-R (Digital Versatile Disc Recordable) and BD (Blu-Ray Disc (registered trademark)).

The display control section 120 controls the display screen of the display device 50. For example, the display control section 120 generates a menu screen including a plurality of icon images and supplies the generated menu screen to the display device 50. Here, when generating a menu screen, the display control section 120 according to the first embodiment uses the online icon image specified by the icon control server 32 as a store icon as illustrated in FIG. 5 if the setting for using online icons is ON.

Figure 5:
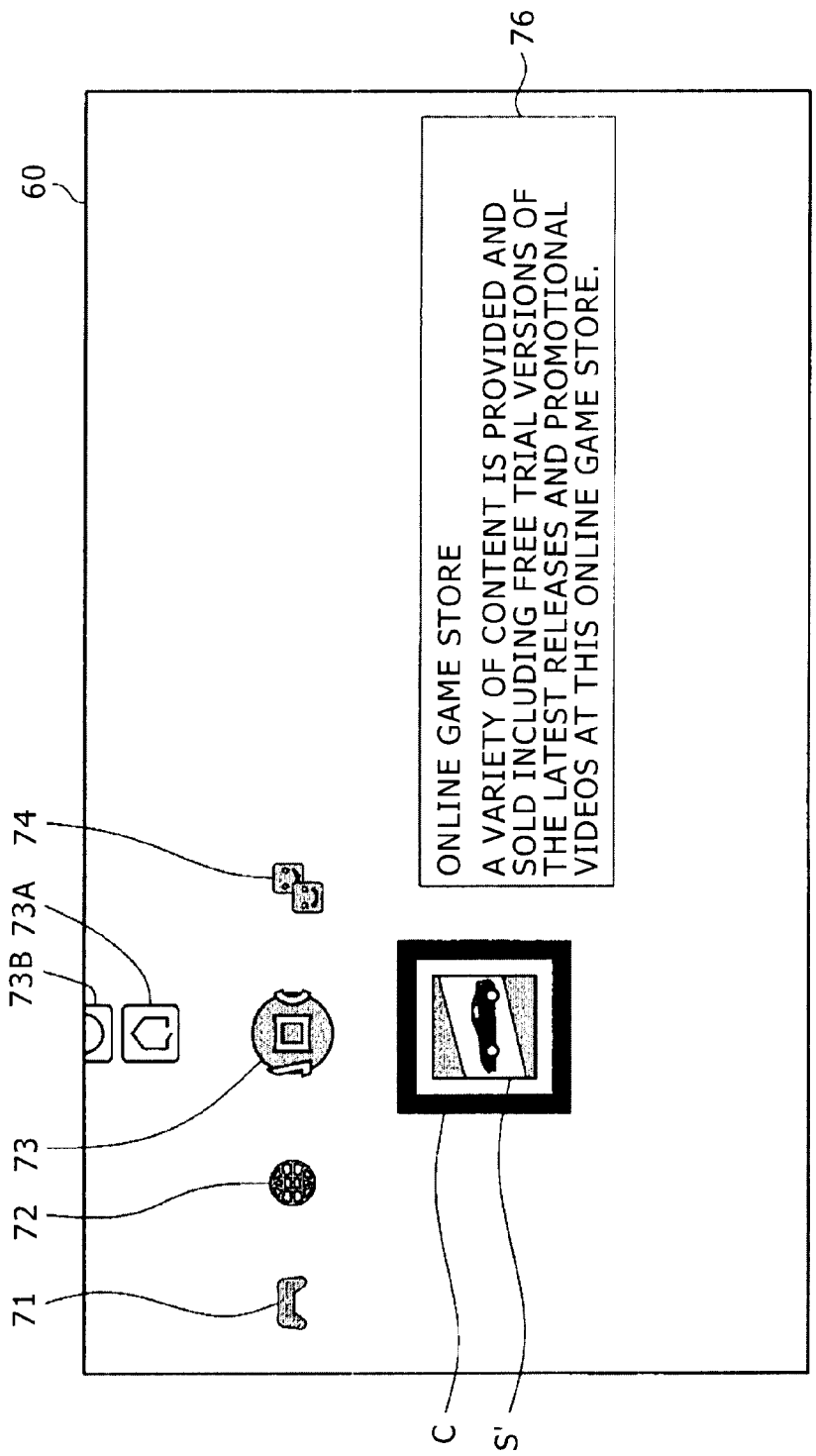

FIG. 5 is an explanatory diagram illustrating a specific example of a menu screen 61 when the setting for using online icons is ON. When the setting for using online icons is ON as illustrated in FIG. 5, the display control section 120 replaces the default store icon S shown in FIG. 2 with a store icon S' specified by the icon control server 32. On the other hand, the display control section 120 uses the default store icon S if the image acquisition section 112 fails to acquire the online icon image (store icon S') or when the setting for using online icons is OFF. Then, the display control section 120 replaces the default store icon S with the store icon S' when the setting for using online icons is switched to ON or when the image acquisition section 112 acquires the icon image (store icon S'). Incidentally, when the user selects the store icon S or S', the communication section 108 accesses the top page of the predetermined online game store.

(Operation of the Display Controller According to the First Embodiment)

A description has been given above of the display controller 11 according to the first embodiment of the present disclosure. Next, the operation of the display controller 11 according to the first embodiment will be sorted out with reference to FIG. 6.

Figure 6:
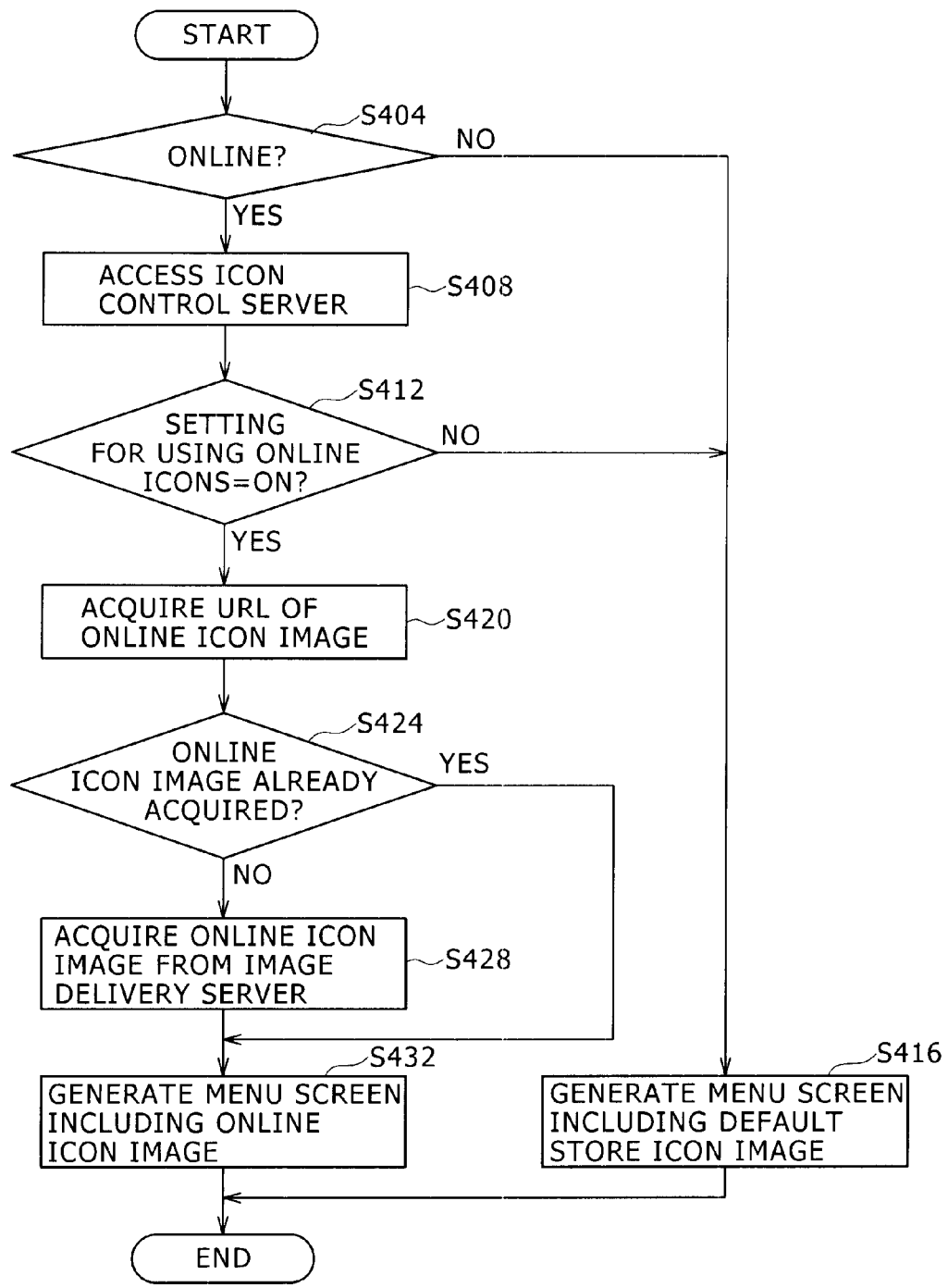
FIG. 6 is a flowchart illustrating the operation of the display controller according to the first embodiment.

FIG. 6 is a flowchart illustrating the operation of the display controller 11 according to the first embodiment. First of all, as illustrated in FIG. 6, if the display controller 11 is online (if the same controller 11 is able to connect with the network 18) (S404), the communication section 108 of the display controller 11 accesses the icon control server 32 (S408).

Then, if the setting for using online icons is OFF (S412), the display control section 120 generates a menu screen including the default store icon S (S416). On the other hand, if the setting for using online icons is ON (S412), the communication section 108 acquires the URL of an online icon image from the icon control server 32 (S420).

Next, the image acquisition section 112 determines whether the online icon image indicated by the URL acquired from the icon control server 32 is an online icon image that has already been acquired and stored in the storage section 116 (S424). If the online icon image has yet to be acquired, the image acquisition section 112 acquires the online icon image from the image delivery server 33 based on the URL (S428). Then, the display control section 120 generates a menu screen including the online icon image as a store icon (S432).

(Recapitulation of the First Embodiment)

As described above, the display controller 11 according to the first embodiment can replace the store icon adapted to access the online game store on the network with the online icon image specified by the icon control server 32. This makes it possible for a business operator to arouse the interest of users and promote the sales by using as an online icon image a specific piece of merchandise or an image that would evoke a sense of the season.

It should be noted that although an example has been described in which the icon control server 32 and image delivery server 33 are separate, the functions thereof may be implemented in the same server. In this case, when the server is accessed by the display controller 11, the online icon image may be transmitted to the display controller 11 together with the setting for using online icons if this setting is ON.

2. SECOND EMBODIMENT

The first embodiment of the present disclosure has been described above. A description will be given next of a second embodiment of the present disclosure. With regard to the second embodiment, if the destination accessed by selecting the store icon is uniquely specified, it would be inconvenient for the user. For example, if the destination accessed by selecting the store icon is specified to the top page of the commercial transaction site, it may be troublesome because it necessitates the user to proceed from the top page of the commercial transaction site to the individual page of the desired piece of merchandise. In contrast, the second embodiment of the present disclosure provides improved ease of use for the user in relation to the use of icon images. A detailed description will be given below of the second embodiment.

(System Configuration of the Second Embodiment)

FIG. 7 is an explanatory diagram illustrating the overall configuration of a display control system according to the second embodiment of the present disclosure. As illustrated in FIG. 7, the display control system according to the second embodiment includes a display controller 12, the controller 20, an ID list server 35, data registration server 36, data delivery server 37, display control server 39 and the display device 50. Further, the display controller 12, ID list server 35, data delivery server 37 and display control server 39 are connected to each other via the network 18. The network 18, controller 20 and display device 50 are the same as described in the first embodiment. Therefore, detailed descriptions thereof are omitted here.

The display controller 12 according to the second embodiment generates a variety of display screens and supplies the generated display screens to the display device 50. For example, the display controller 12 generates a display screen including a plurality of icon images and supplies this menu screen to the display device 50. Here, the display controller 12 according to the present embodiment generates a menu screen using online data (e.g., element image data such as moving and still images or music data) as described in detail later if the store icon included in the menu screen is focused. Further, the display controller 12 can access different web pages according to the type of operation performed on the store icon.

Incidentally, as with the display controller 11 according to the first embodiment, the display controller 12 according to the second embodiment may be an information processor such as a PC, home video processor, PDA, home electronic appliance, smartphone, mobile phone, PHS, portable music player, portable video processor or portable gaming machine.

—ID List Server—

The ID list server 35 has an ID list including data IDs of music data, still image data and moving image data. The ID list server 35 has a fixed URL such as "http://AAA.AA.AA/AA.xml" as illustrated in FIG. 7 so that the display controller 12 can access the ID list server 35 in accordance with this fixed URL and acquire the ID list. A description will be given here of a configuration example of an ID list possessed by the ID list server 35.

FIG. 8 is an explanatory diagram illustrating a specific example of an ID list possessed by the ID list server 35. As illustrated in FIG. 8, the list includes a last updated date 48 and information of each piece of online data. Incidentally, the last updated date 48 is "2011/6/30" in this example shown in FIG. 8. Further, as illustrated in FIG. 8, information about each piece of online data (data D1 to D6) includes a data type, data size, data expiry date, data priority level and data ID. For example, the data D1 with an ID of "10001" is image data in "png" format, "845 Byte" in size and has an expiry date of "2099/12/31" with a data priority level of "1."

Similarly, FIG. 8 illustrates information of the data D2 (ID: 10002), data D3 (ID: 22304), data D4 (ID: 22305), data D5 (ID: 32045) and data D6 (ID: 39345).

—Data Registration Server—

As illustrated in FIG. 7, the data registration server 36 makes up the display control system according to the second embodiment and places data in the data delivery server 37. More specifically, the data registration server 36 automatically generates a file name of data uploaded by the operator and places the data in the data delivery server 37.

—Data Delivery Server—

The data delivery server 37 stores a variety of online data placed by the data registration server 36 and delivers the data requested by the display controller 12 to the same controller 12. The same server 37 has a fixed URL such as "http://BBB.BB.BB/BB" as illustrated in FIG. 7, and each of the stored pieces of online data is assigned a URL obtained by appending the fixed URL, for example, with the hash value of the data ID. It is thus possible to prevent a third party from unintentionally predicting the URL of each piece of online data by including the hash value of the data ID in the URL of each piece of online data.

Figure 9:
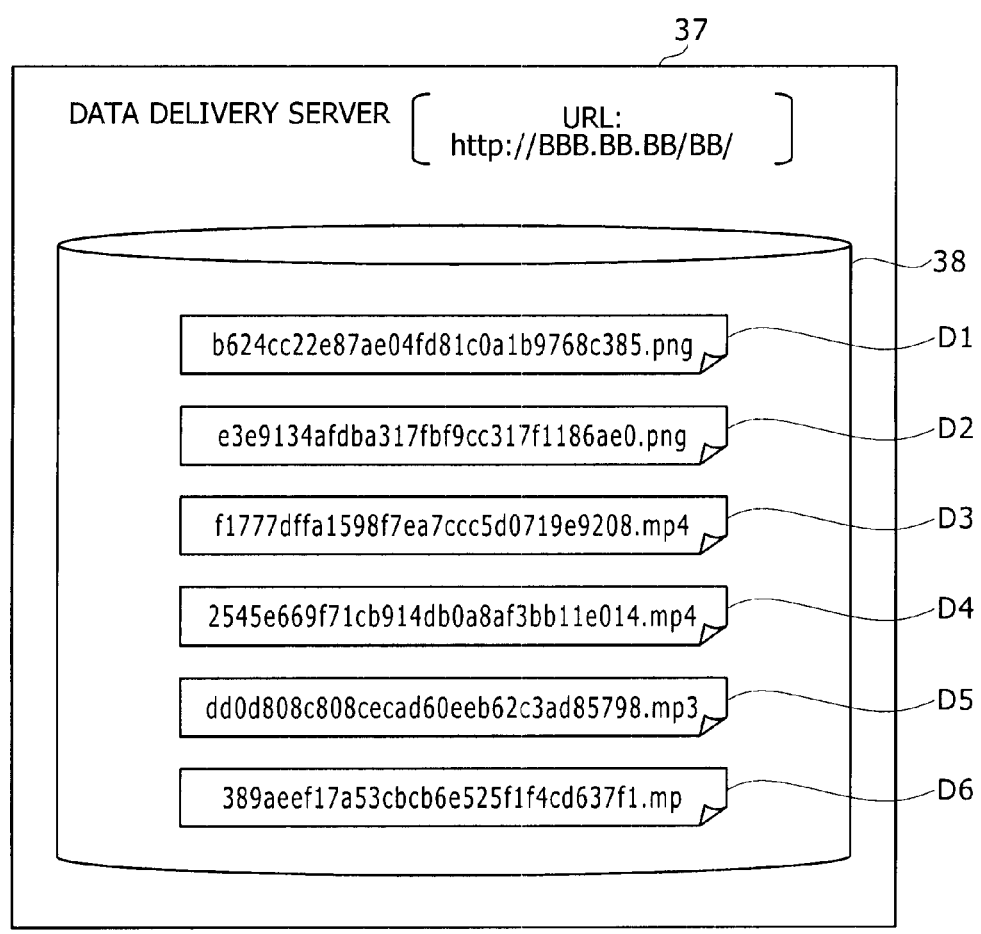
FIG. 9 is an explanatory diagram illustrating a configuration example of a data storage section of a data delivery server.

FIG. 9 is an explanatory diagram illustrating a configuration example of a data storage section 38 of the data delivery server 37. As illustrated in FIG. 9, the data storage section 38 stores a variety of online data such as the data D1 to D6. Incidentally, the name of each piece of the online data is the hash value of the data ID and it constitutes part of the URL of each piece of the online data.

—Display Control Server—

The display control server 39 specifies online data to be used to generate a menu screen. Further, the display control server 39 can switch the setting for using online data from ON to OFF or vice versa. For example, if the setting for using online data is OFF, the display controller 12 acquires a script such as <storedisplay use="off"/> from the display control server 39. On the other hand, if the setting for using online data is ON, the display controller 12 acquires a script such as the one shown in FIG. 10.

FIG. 10 is an explanatory diagram illustrating a specific example of a script acquired from the display control server 39 when the setting for using online data is ON. As illustrated in FIG. 10, this script includes different pieces of information, namely, <storedisplay use="on"> indicating that the setting for using online data is ON, another piece of information indicating the online data D2 with an ID of "10002" and still another piece of information indicating the online data D3 with an ID of "22304."

Further, the script shown in FIG. 10 includes text information T of a text "This is Wonderful Game", and link information L "1031". The display controller 12 can generate a menu screen using the online data D2 and D3, text information T and so on by acquiring such a script from the display control server 39. Further, by use of the link information L, the display controller 12 can control the destination accessed by selecting the store icon according to the type of operation performed on the store icon. A detailed description will be given below of the display controller 12 according to the second embodiment configured as described above.

(Configuration of the Display Controller According to the Second Embodiment)

Figure 11:
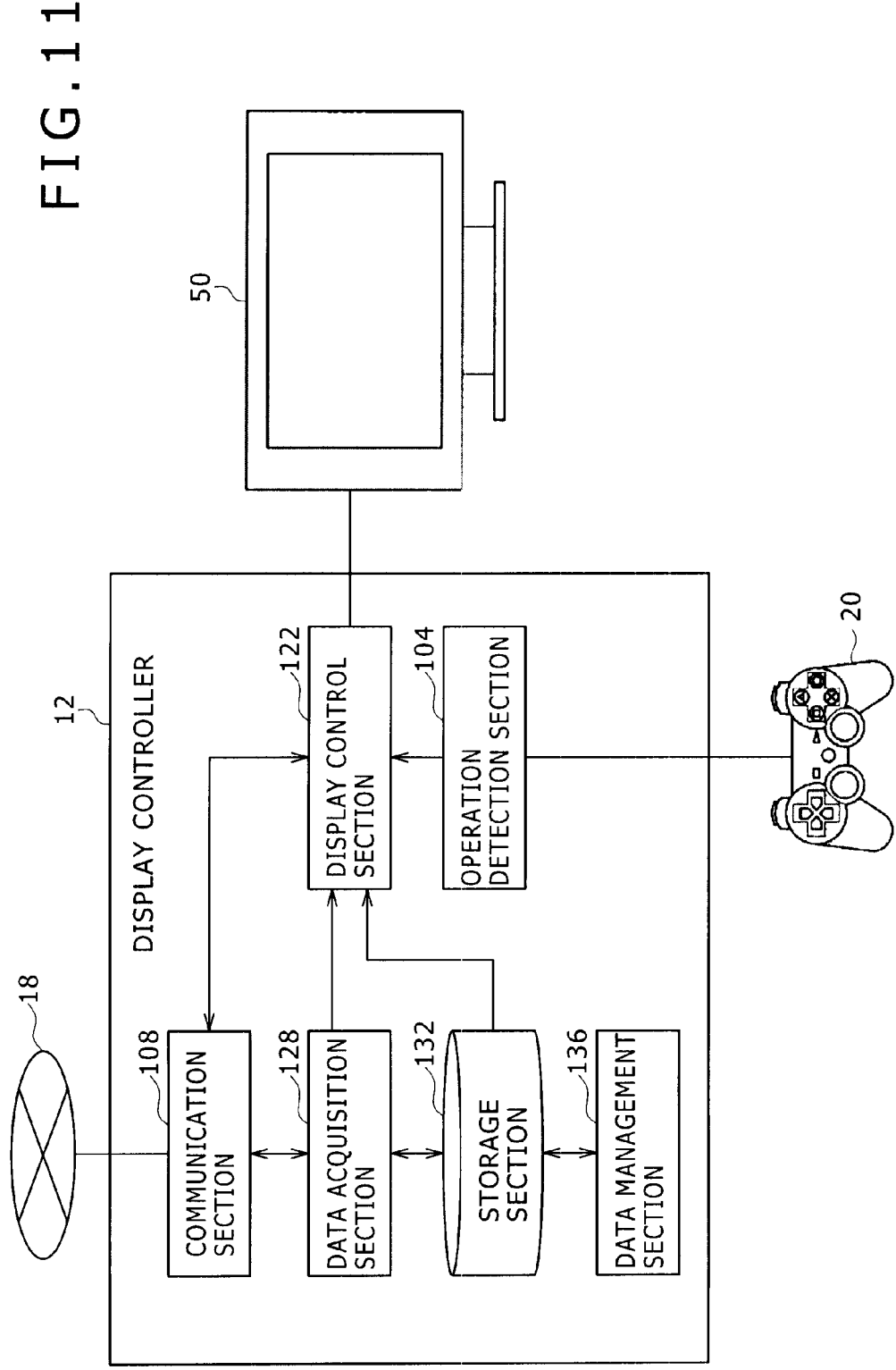
FIG. 11 is a functional block diagram illustrating the configuration of a display controller according to the second embodiment.

FIG. 11 is a functional block diagram illustrating the configuration of the display controller 12 according to the second embodiment. As illustrated in FIG. 11, the display controller 12 includes the operation detection section 104, communication section 108, a display control section 122, data acquisition section 128, storage section 132 and data management section 136.

The operation detection section 104 detects the user operation performed on the controller 20 based on the operation signal supplied from the controller 20 as described in the first embodiment. Then, the operation detection section 104 supplies the detection result of the user operation to, for example, the display control section 122.

The communication section 108 communicates with the network nodes such as the ID list server 35, data delivery server 37 and display control server 39 via the network 18 when the OS is activated, when the screen changes to a specific screen or periodically. For example, the communication section 108 accesses the ID list server 35 to acquire the online data ID list as shown in FIG. 8 from the ID list server 35.

Further, the communication section 108 controls access to the link destinations according to the type of operation performed on the store icon. For example, the communication section 108 may access the top page of the online game store when the store icon is selected by the circle button 24B as a first operation. On the other hand, the communication section 108 may access, for example, an individual page of a piece of merchandise which is in a lower hierarchy of the online game store when the store icon is selected by the triangle button 24A as a second operation. In this case, the user can directly access the individual page of the desired piece of merchandise by selecting the store icon with the triangle button 24A as the second operation, thus contributing, to improved ease of use for the user.

The data acquisition section 128 acquires online data from the data delivery server 37 via the communication section 108. More specifically, the same section 128 checks the last updated date of the ID list acquired from the ID list server 35. If the last updated date is more recent than that at the previous check, the data acquisition section 128 acquires, from the data delivery server 37, the online data that has yet to be stored in the storage section 132 of all the pieces of online data listed in the ID list according to their priority levels shown in the ID list. For example, the data acquisition section 128 may acquire, from the data delivery server 37, online data starting with those whose priority levels shown in the ID list are high and to the extent that the storage capacity of the storage section 132 is not exceeded.

The storage section 132 stores the online data ID list acquired from the ID list server 35 and the online data acquired from the data delivery server 37. For example, the same section 132 stores an ID list 92 and online data D1, D3, D6 and D7.

Figure 12:
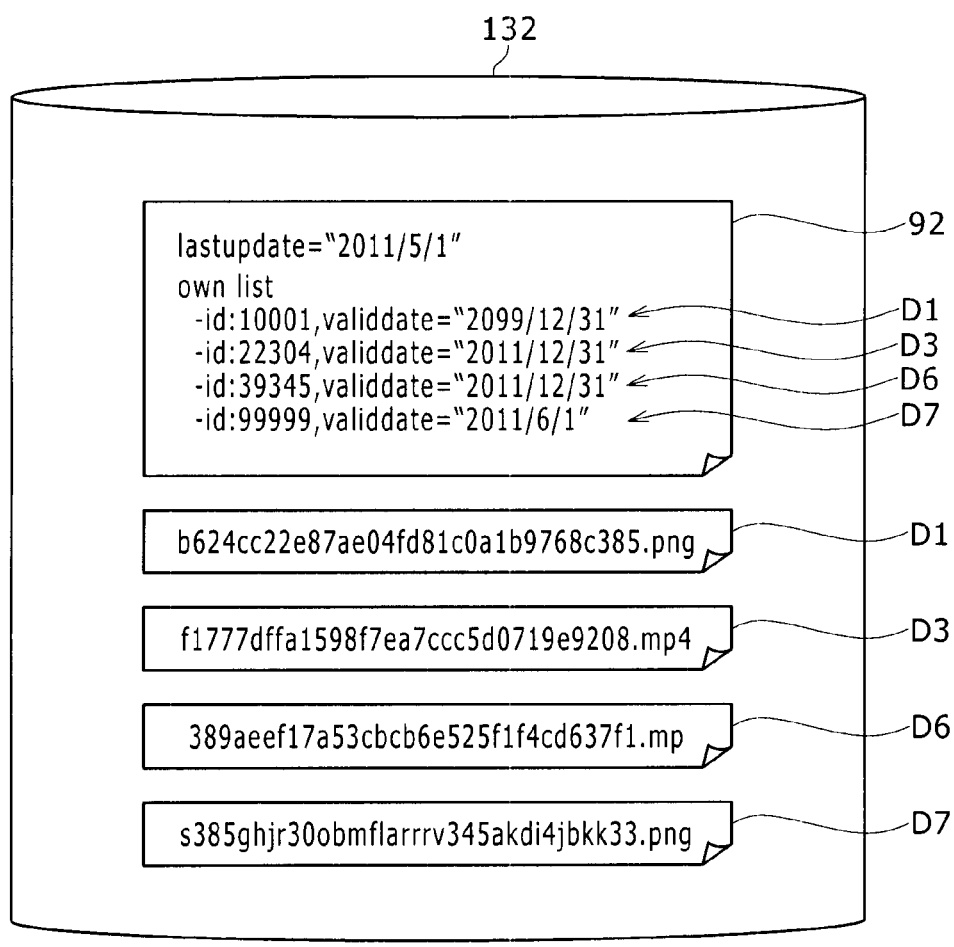
FIG. 12 is an explanatory diagram illustrating the configuration of a memory section.

The data management section 136 manages the online data stored in the storage section 132. More specifically, the same section 136 checks the expiry dates of the online date stored in the storage section 132 when the OS is activated, when the screen changes to a specific screen or periodically, and deletes the online data whose expiry date has passed. For example, if the storage section 132 is storing the online data D1, D3, D6 and D7 shown in FIG. 12, the expiry date of the online data D7 "2011/6/1" has already passed (current date=2011/7/1). Therefore, the data management section 136 may delete the online data D7.

Further, when the total amount of online data stored in the storage section 132 is exceeding a predetermined level, the data management section 136 may delete online data in order of priority from the lowest so as to secure a free space in the storage section 132.

The display control section 122 controls the display screen of the display device 50. For example, the same section 122 generates a menu screen including a plurality of icon images and supplies the generated menu screen to the display device 50. Here, if the store icon is focused on the screen, the display controller 12 according to the second embodiment reconstructs the menu screen using the online data specified by the display control server 39. A specific description will be given below in this regard with reference to FIG. 13.

Figure 13:
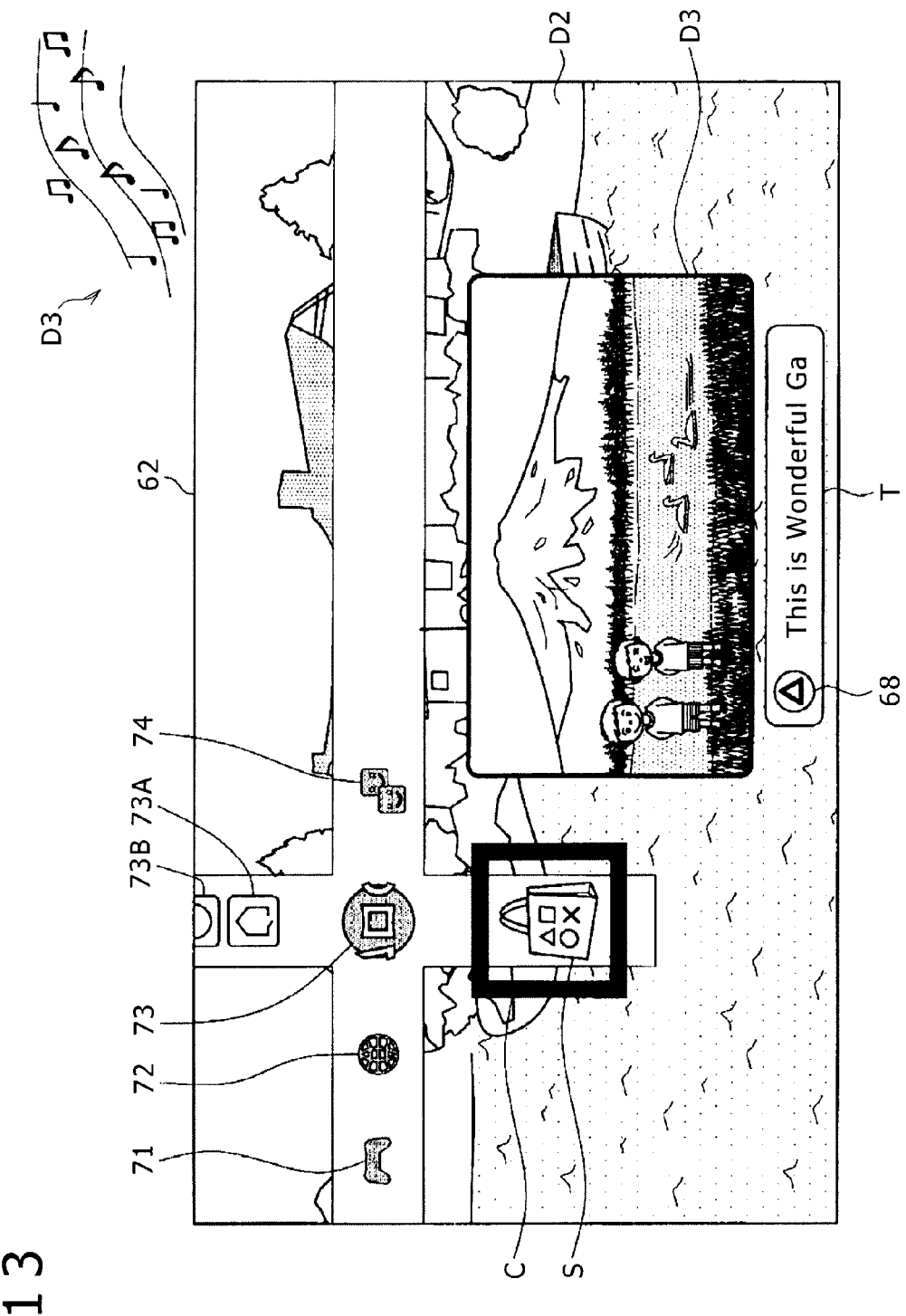
FIG. 13 is an explanatory diagram illustrating a specific example of a menu screen according to the second embodiment.

FIG. 13 is an explanatory diagram illustrating a specific example of a menu screen 62 according to the second embodiment. More specifically, FIG. 13 illustrates the menu screen 62 of when the store icon S is focused by positioning the cursor C over the same icon S and a script as shown in FIG. 10 has been acquired from the display control server 39.

As illustrated in FIG. 13, the background of the menu screen 62 is replaced with the online data D2 specified by the display control server 39. In addition, the online data D3 specified by the display control server 39 is inserted in the menu screen 62. Here, the online data D3 is moving image data so the audio of the online data D3 is also played back. The online data D3 is, for example, moving image data relating to a specific game.

Further, the text "This is Wonderful Game" included in the script acquired from the display control server 39, i.e., the text information T relating to the online data D3, is inserted at the bottom of the display area of the online data D3 as illustrated in FIG. 13. The text information T is scrolled in this example. In addition, a triangle button 68 appears to the left of the display area of the text information T.

In the menu screen 62 configured as above, the display controller 12 accesses different link destinations according to the type of selection operation performed on the store icon S. More specifically, when the store icon S is selected, for example, by the circle button 24B or left clicking of the mouse as the first operation, the communication section 108 of the display controller 12 may access the top page of the online game store after activation of the application.

On the other hand, if the store icon S is selected, for example, by the triangle button 24A as the second operation or right clicking of the mouse, the communication section 108 may access the link destination indicated by the link information L included in the script acquired from the display control server 39 after activation of the application. Here, the display control server 39 may set an individual page relating to a specific game indicated by the online data D3 as the link destination indicated by the link information L. In this case, it is possible to arouse the interest of the user in the specific game using the online data D3 and guide the user to the individual page relating to the specific game through a simple operation.

(Operation of the Display Controller According to the Second Embodiment)

A description has been given above of the configuration of the display controller 12 according to the second embodiment of the present disclosure. Next, the operation of the display controller 12 according to the second embodiment will be sorted out with reference to FIG. 14.

Figure 14:
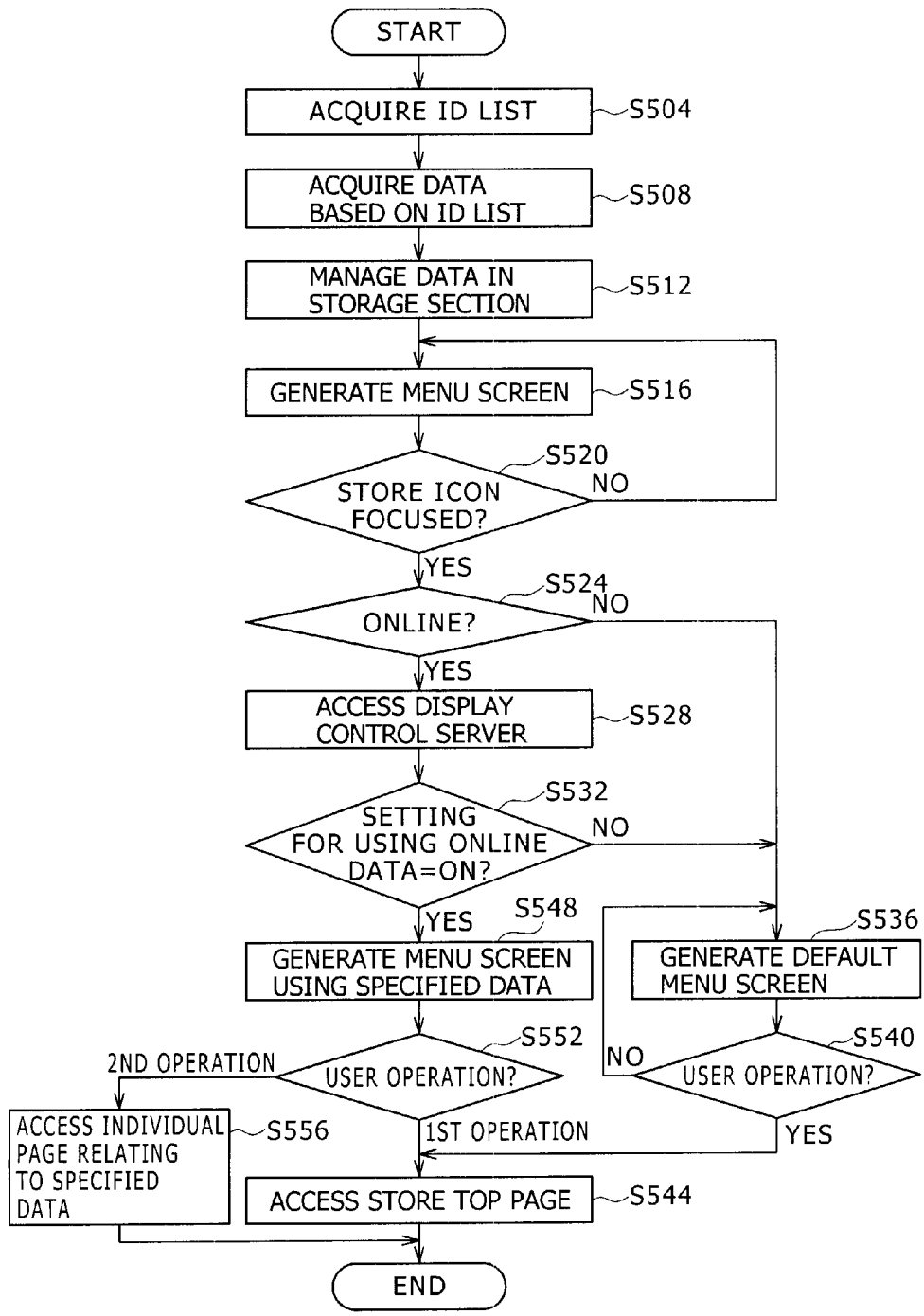
FIG. 14 is a flowchart illustrating the operation of the display controller according to the second embodiment.

FIG. 14 is a flowchart illustrating the operation of the display controller 12 according to the second embodiment. First of all, as illustrated in FIG. 14, the display controller 12 acquires the online data ID list from the ID list server 35 (S504). Then, the data acquisition section 128 of the display controller 12 identifies the URI, of the online data based on the ID list, acquiring the online data from the data delivery server 37 (S508). Then, the data management section 136 checks the storage section 132 when the OS is activated, when the screen changes to a specific screen or periodically, and deletes online data that are expired or low in priority level (S512).

The display control section 122 generates a menu screen based on the user operation detected by the operation detection section 104 (S516). After that, when the store icon is focused on the menu screen (S520), if the display controller 12 is online (S524), the communication section 108 accesses the display control server 39 (S528). Here, if the setting for using online data is OFF (S532), or if the display controller 12 is offline (S524), the display control section 122 generates a default menu screen (S536). Then, as the user selects the store icon, the communication section 108 accesses the top page of the online game store (S544).

On the other hand, if the setting for using online icons is ON (S532), the display control section 122 reconstructs the menu screen using the online data specified by the display control server 39 (S548).

Then, when the store icon is selected by the first operation of the user (e.g., pressing the circle button 24B), the communication section 108 accesses the top page of the online game store (S544). On the other hand, when the store icon is selected by the second operation of the user (e.g., pressing the triangle button 24A), the communication section 108 accesses the individual page relating to the specified online data (S556).

It should be noted that although an example has been described above in which online data is acquired in advance before accessing to the display control server 39, the present embodiment is not limited thereto. For example, the display controller 12 may access the display control server 39 at the time a menu screen is displayed or at the time the store icon is focused, and then acquire the online data specified by the display control server 39 from the data delivery server 37. Alternatively, the display control server 39 may transmit the substance of the specified online data directly to the display controller 12.

(Recapitulation of the Second Embodiment)

As described above, when the store icon is focused on the menu screen, the display controller 12 according to the second embodiment can reconstruct the menu screen using the online data specified by the display control server 39. This makes it possible for a business operator to arouse the interest of users and promote the sales in the online game store by using a specific piece of merchandise or an image that would evoke a sense of the season as online data, as with the first embodiment.

Further, the display control server 39 according to the second embodiment can access the top page of the online game store when the store icon is selected by the first operation, and can access the individual page relating to the online data displayed on the menu screen when the store icon is selected by the second operation. This eliminates the need for the user whose interest in a specific piece of merchandise has been aroused by the online data to proceed from the top page to the individual page of the piece of merchandise, thus contributing to improved ease of use for the user.

It should be noted that although an example has been described above in which two types of operations are used to select the store icon, the number of types of the selection operation is not limited to two. For example, the display control server 39 may provide a plurality of pieces of link information to the display controller 12, and the same controller 12 may access the link destination indicated by one of the link information according to the type of selection operation performed on the store icon.

3. THIRD EMBODIMENT

The second embodiment of the present disclosure has been described above. A description will be given next of a third embodiment of the present disclosure. The third embodiment allows a popup display specified by the network 18 to be added to the store icon. Further, the third embodiment is adapted such that it can connect to different link destinations between when the store icon is selected and when the popup display is selected. A detailed description will be given below of the third embodiment configured as described above.

(System Configuration of the Third Embodiment)

Figure 15:
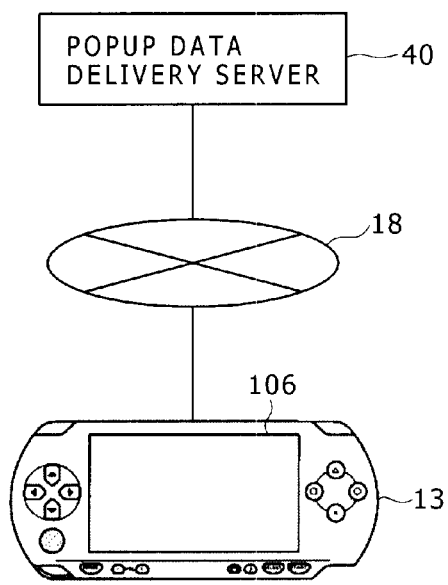
FIG. 15 is an explanatory diagram illustrating the overall configuration of a display control system according to a third embodiment of the present disclosure.

FIG. 15 is an explanatory diagram illustrating the overall configuration of a display control system according to the third embodiment of the present disclosure. As illustrated in FIG. 15, the display control system according to the third embodiment includes a display controller 13 and popup data delivery server 40.

The display controller 13 according to the third embodiment includes an operation display section 106 having operation detection and display capabilities so that a variety of display screens can be displayed on the operation display section 106. Further, the display controller 13 is connected to the popup data delivery server 40 via the network 18 and acquires popup data from the popup data delivery server 40. This makes it possible for the display controller 13 to add a popup display based on the popup data acquired from the popup data delivery server 40 to the menu screen including a plurality of icon images as described in detail later.

It should be noted that although a portable gaming machine is shown as an example of the display controller 13 in FIG. 15, the display controller 13 is not limited to a portable gaming machine. The display controller 13 according to the third embodiment may be, for example, an information processor such as a PC, home video processor, home gaming machine, PDA, home electronic appliance, smartphone, mobile phone, PHS, portable music player or portable video processor as in the first and second embodiments. Accordingly, the input mechanism of the display controller 13 is not limited to the operation display section 106, and may instead be a controller, mouse, keyboard or touch pad.

The popup data delivery server 40 stores popup data for popups and supplies the popup data to the display controller 13 via the network 18. This popup data includes text and link information. A more detailed description will be given below of such popup data stored in the popup data delivery server 40 with reference to FIG. 16.

Figure 16:
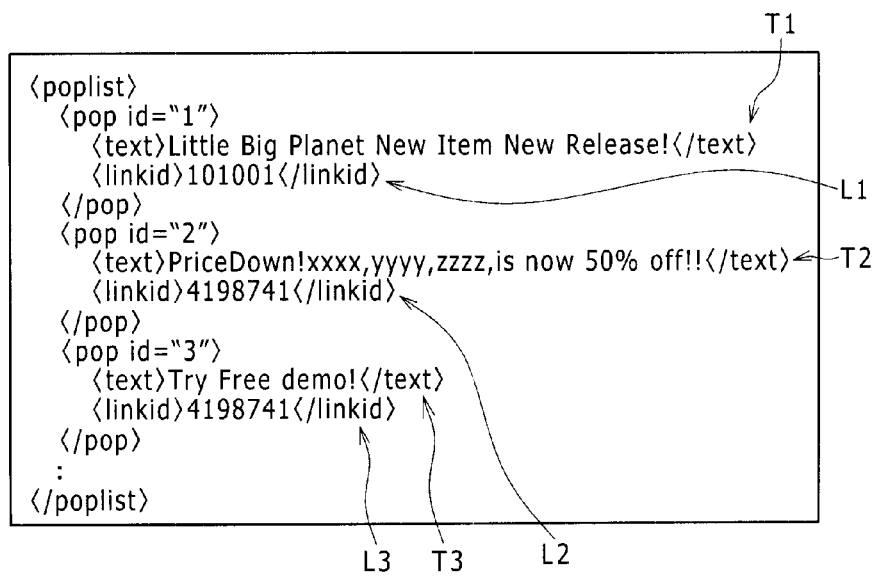
FIG. 16 is an explanatory diagram illustrating a specific example of popup data stored in a popup data delivery server.

FIG. 16 is an explanatory diagram illustrating a specific example of popup data stored in the popup data delivery server 40. As illustrated in FIG. 16, the popup data stored in the popup data delivery server 40 includes text and link information relating to a plurality of popups. FIG. 16 illustrates, as popup data, text information T1 and link information L1 relating to a first popup, text information T2 and link information L2 relating to a second popup, and text information T3 and link information L3 relating to a third popup.

The display controller 13 according to the third embodiment can display a menu screen added with popups based on popup data by acquiring the popup data as that shown in FIG. 16. A more detailed description will be given below of the display controller 13 according to the third embodiment configured as described above.

(Configuration of the Display Controller According to the Third Embodiment)

Figure 17:
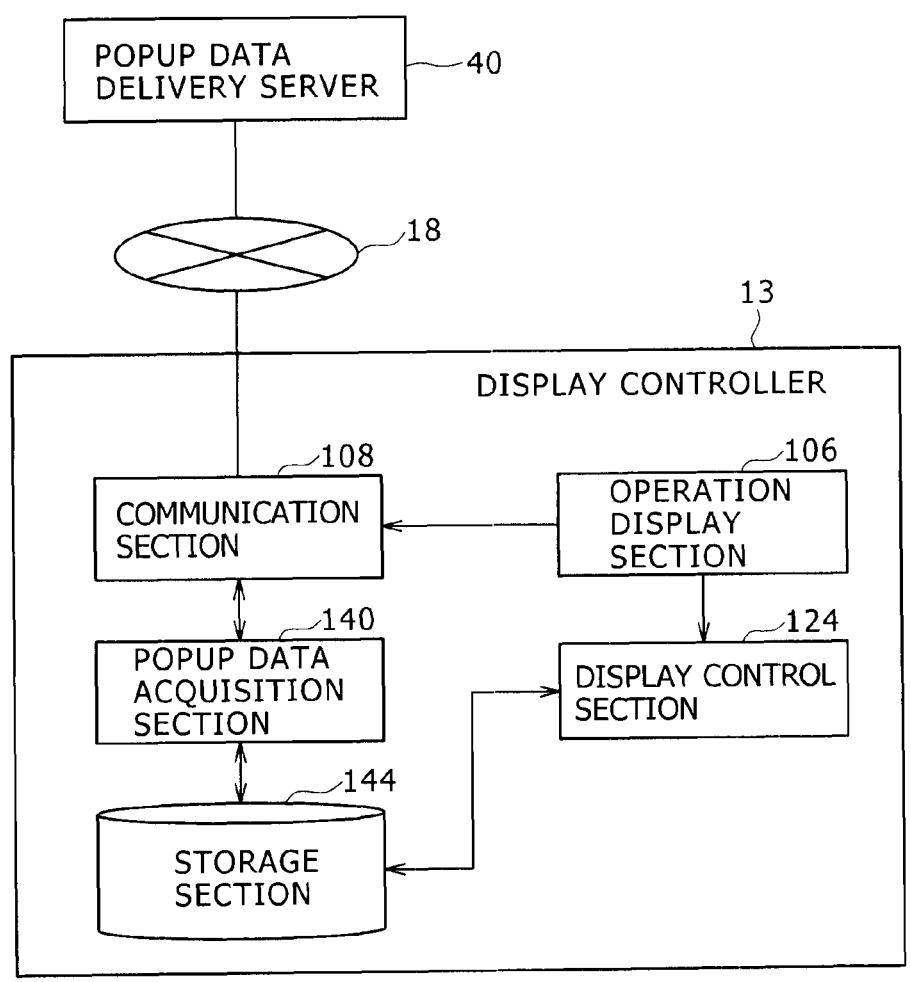
FIG. 17 is a functional block diagram illustrating the configuration of a display controller according to the third embodiment.

FIG. 17 is a functional block diagram illustrating the configuration of the display controller 13 according to the third embodiment. As illustrated in FIG. 17, the display controller 13 according to the third embodiment includes the operation display section 106, communication section 108, a display control section 124, popup data acquisition section 140 and storage section 144.

The operation display section 106 has operation detection and display capabilities. For example, the same section 106 includes a touch panel and a liquid crystal display. The operation display section 106 can detect tapping, flicking and other operations performed by the user and display a display screen generated by the display control section 124. The communication section 108 communicates with the network nodes such as the popup data delivery server 40 via the network 18. Further, when the store icon or popup is selected by the user on the menu screen, the communication section 108 accesses the link destination appropriate to the store icon or popup after activation of the application.

The popup data acquisition section 140 accesses the popup data delivery server 40 at the time the OS is activated, at the time the screen changes to a specific screen or periodically, and acquires popup data from the same server 40.

The storage section 144 stores the popup data acquired by the popup data acquisition section 140. Incidentally, the same section 144 may be a storage medium such as a non-volatile memory, magnetic disc, optical disc or MO disc.

The display control section 124 controls the display screen of the operation display section 106. For example, the same section 124 generates a menu screen including a plurality of icon images and supplies the generated menu screen to the operation display section 106. Here, the display control section 124 according to the third embodiment adds a popup to the store icon on the menu screen based on the popup data acquired from the popup data delivery server 40. A more detailed description will be given below in this regard with reference to FIG. 18.

Figure 18:
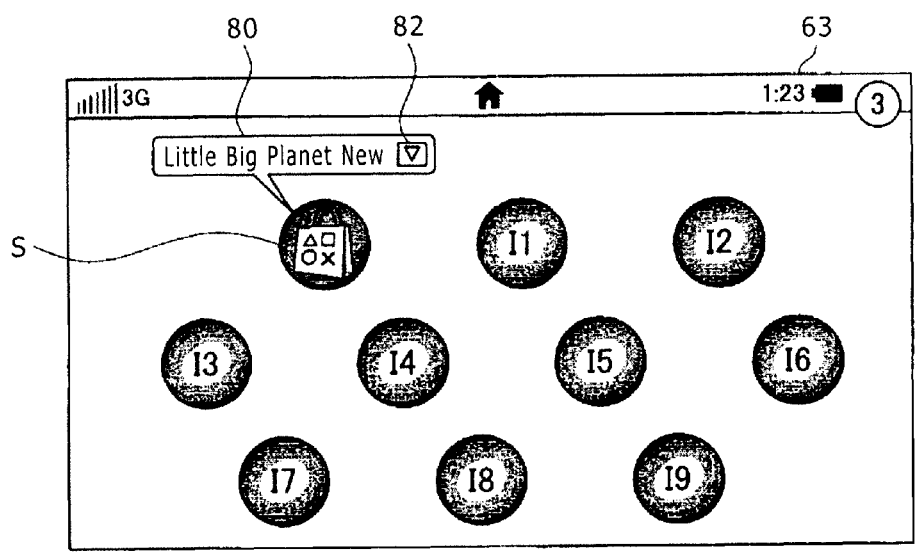
FIG. 18 is an explanatory diagram illustrating a specific example of a menu screen according to the third embodiment.

FIG. 18 is an explanatory diagram illustrating a specific example of a menu screen 63 according to the third embodiment. As illustrated in FIG. 18, the menu screen according to the third embodiment includes the store icon S and other icon images I1 to I9. In addition, a popup 80 is added to the store icon S. The popup 80 includes the text information T1 and a list display button 82 acquired from the popup data delivery server 40 as illustrated in FIG. 18.

Incidentally, the display control section 124 scrolls the text information T1 to display the entire text. Further, when the text information T1 is displayed a predetermined number of times by scrolling, the display control section 124 sequentially displays the text information T2 and T3. On the other hand, if the acquisition of popup data fails or when no popup data is specified, the popup 80 is not added to the store icon S.

If the store icon S is selected by the user on the menu screen configured as described above, the communication section 108 accesses the top page of the online game store. On the other hand, if the popup 80 is selected, the communication section 108 accesses the link destination indicated by the link information acquired from the popup data delivery server 40. For example, when the popup 80 based on the text information T1 shown in FIG. 16 is selected, the communication section 108 accesses the link destination indicated by the link information L1.

Here, the individual page of the piece of merchandise relating to the text information T1 may be set as the link destination indicated by the link information L1. This makes it possible to arouse the interest of the user in the piece of merchandise relating to the text information T1 using the popup 80 and directly guide the user to the individual page relating to the piece of merchandise.

Further, when the list display button 82 is selected, the display control section 124 generates a popup list including text information about a plurality of popups. A specific description thereof will be given below with reference to FIG. 19.

Figure 19:
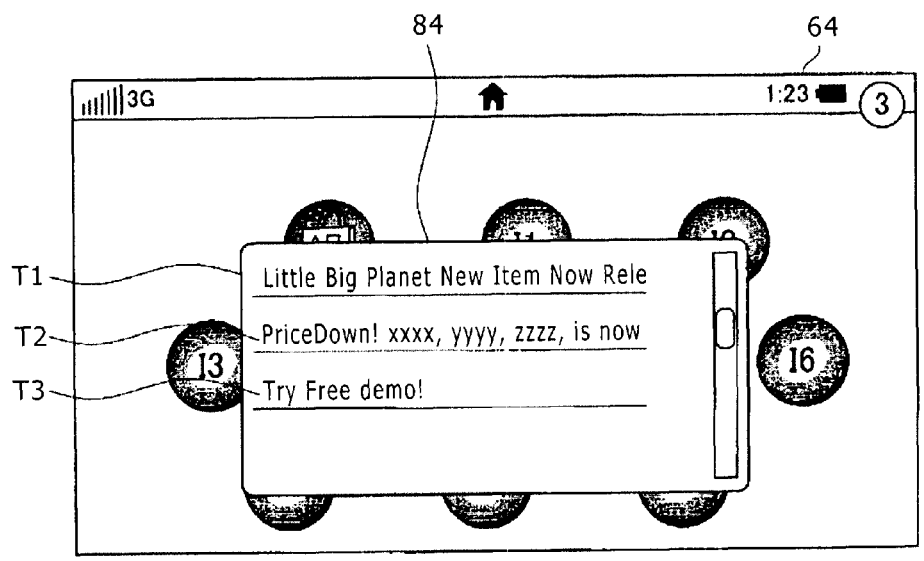
FIG. 19 is an explanatory diagram illustrating a specific example of a popup list.

FIG. 19 is an explanatory diagram illustrating a specific example of a popup list. As illustrated in FIG. 19, the popup list 84 includes the plurality of pieces of text information T1 to T3. When one of these pieces of text information is selected in the popup list 84, the communication section 108 accesses the link destination indicated by the link information appropriate to the selected text information. For example, if the text information T2 is selected, the communication section 108 may access the link destination indicated by the link information L2 shown in FIG. 16.

Incidentally, although an example is shown in FIG. 19 in which the popup list 84 includes only the plurality of pieces of text information T1 to T3, the content of the popup list 84 is not limited to that of this example. For example, it is possible to add icon images appropriate to the pieces of text information T1 to T3 to the popup list 84 by adapting the popup data delivery server 40 to set the icon images (or URLs of the icon images) in the popup data.

(Operation of the Display Controller According to the Third Embodiment)

A description has been given above of the configuration of display controller 13 according to the third embodiment of the present disclosure. Next, the operation of the display controller 13 according to the third embodiment will be sorted out with reference to FIG. 20.

Figure 20:
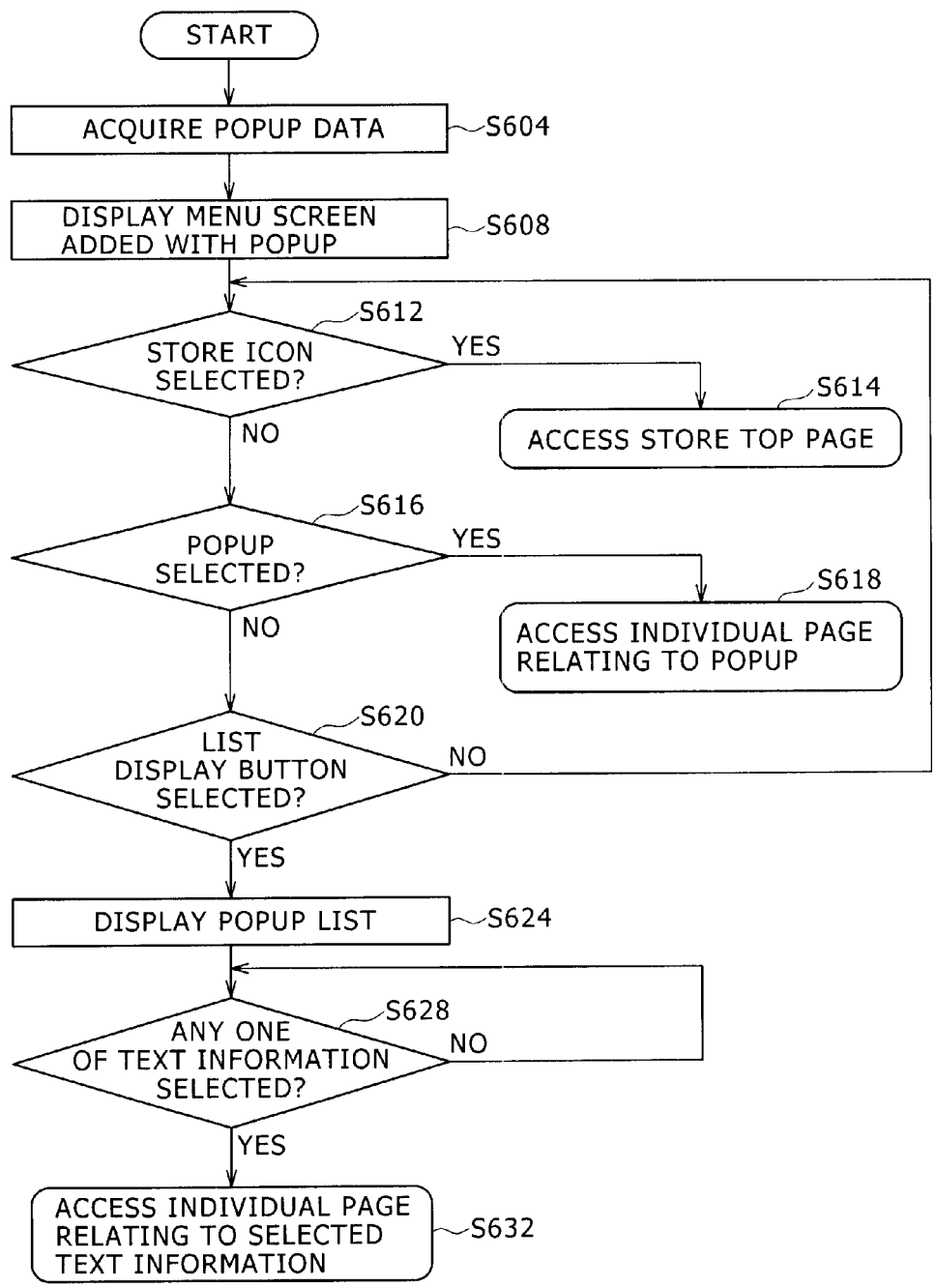
FIG. 20 is a flowchart illustrating the operation of the display controller according to the third embodiment.

FIG. 20 is a flowchart illustrating the operation of the display controller 13 according to the third embodiment. First of all, as illustrated in FIG. 20, when the display controller 13 acquires popup data from the popup data delivery server 40 (S604), the display control section 124 displays a menu screen including the store icon added with the popup in accordance with the popup data (S608).

Then, if the store icon is selected on the menu screen (S612), the communication section 108 accesses the top page of the online game store (S614). On the other hand, if the popup is selected on the menu screen (S616), the communication section 108 accesses the individual page set for the popup (S618).

Further, if the list display button is selected on the menu screen (S620), the display control section 124 displays a popup list on the operation display section 106 (S624). Then, if one of the pieces of text information in the popup list is selected by the user (S628), the communication section 108 accesses the individual page relating to the selected text information (S632).

(Recapitulation of the Third Embodiment)

As described above, the display controller 13 according to the third embodiment can acquire popup data from the popup data delivery server 40 and add a popup to the store icon on the menu screen. Further, the display controller 13 can directly access the individual page relating to the popup if the popup is selected. This makes it possible to arouse the interest of the user in a specific piece of merchandise and directly guide the user to the individual page relating to the piece of merchandise.

4. CONCLUSION

The first to third embodiments of the present disclosure have been described above. The display controller 11 according to the first embodiment can replace a store icon adapted to access an online game store on a network with an online icon image specified by the icon control server 32. This makes it possible for a business operator to arouse the interest of users and promote the sales by using a specific piece of merchandise or an image that would evoke a sense of the season as an online icon image.

Further, the display controller 12 according to the second embodiment can reconstruct a menu screen using the online data specified by the display control server 39 when the store icon is focused on the menu screen. This makes it possible for a business operator to arouse the interest of users and promote the sales in the online game store by using a specific piece of merchandise or an image that would evoke a sense of the season as online data, as with the first embodiment.

Still further, the display controller 13 according to the third embodiment can acquire popup data from the popup data delivery server 40 and add a popup to the store icon on the menu screen. Further, the display controller 13 can directly access the individual page relating to the popup when the popup is selected. This makes it possible to arouse the interest of a user in a specific piece of merchandise and directly guide the user to the individual page relating to the piece of merchandise.

It should be noted that while the preferred embodiments of the present disclosure have been described above in detail with reference to the accompanying drawings, the technical scope of the present disclosure is not limited to these examples. It is apparent that those skilled in the art can visualize various changes and modifications that can be made to the present disclosure without departing from the technical concept thereof described in the claims, and it is a matter of course that these changes and modifications are also construed as falling within the technical scope of the present disclosure.

For example, the steps of the processes handled by the display controllers 11 to 13 in the present specification need not necessarily be performed chronologically according to the sequences described in the flowcharts. For example, the steps of the processes handled by the display controllers 11 to 13 may be performed in sequences different from those described in the flowcharts or in a parallel manner.

Further, it is possible to create a computer program for allowing hardware such as a CPU, ROM and RAM incorporated in the display controllers 11 to 13 to have functions equivalent to those of the components of the display controllers 11 to 13. Still further, a storage medium storing the computer program is also provided.

The following configurations also fall within the technical scope of the present disclosure.

(1) An information processing apparatus comprising: a processor that: acquires first data from a first server connected to the information processing apparatus via a network; generates a first menu based on the first data; controls a display to display the first menu; acquires second data from a second server connected to the information processing apparatus via a network based on a received input corresponding to the first menu; generates a second menu based on the second data; and controls the display to display the second menu.

(2) The information processing apparatus of (1), further comprising: a communication interface connected to the display, wherein the processor controls the display to display the first and second menus by transmitting the first and second menus to the display.

(3) The information processing apparatus of (1) or (2), further comprising: the display, wherein the processor controls the display to display the first and second menus.

(4) The information processing apparatus of any one of (1) to (3), wherein the first and second menus each include a plurality of icons arranged in horizontal and vertical directions.

(5) The information processing apparatus of any one of (1) to (4), further comprising: a memory that stores address information corresponding to the first server.

(6) The information processing apparatus of (5), wherein the processor acquires the first data from the first server based on the address information corresponding to the first server stored at the memory.

(7) The information processing apparatus of any one of (1) to (6), wherein the first data acquired from the first server includes address information corresponding to the second server.

(8) The information processing apparatus of (7), wherein the processor acquires the second data from the second server based on the address information corresponding to the second server acquired from the first server.

(9) The information processing apparatus of any one of (1) to (8), wherein the first data acquired from the first server includes address information corresponding to an icon image stored at the second server.

(10) The information processing apparatus of (9), wherein the processor acquires the icon image stored at the second server based on the address information corresponding to the icon image and generates the second menu based on the acquired icon image.

(11) The information processing apparatus of any one of (1) to (10), wherein the first data acquired from the first server includes an icon image and address information associated with the icon image.

(12) The information processing apparatus of (11), wherein the first menu includes the icon image, and the received input corresponding to the first menu corresponds to a selection or focus on the icon image on the display.

(13) The information processing apparatus of (12), wherein the processor acquires the second data from the second server based on the received input and the address information associated with the icon image.

(14) The information processing apparatus of (13), wherein the address information associated with the icon image corresponds to at least one of music data, still image data, moving image data and text data.

(15) The information processing apparatus of (13), wherein the processor generates the second menu based on data associated with the icon image that corresponds to the address information associated with the icon image.

(16) The information processing apparatus of (14), wherein the processor generates the second menu by including the at least one of the music data, still image data, moving image data and text data in the second menu.

(17) The information processing apparatus of any one of (1) to (16), wherein the second menu includes a plurality of graphic indicia and link information is associated with each of the plurality of graphic indicia.

(18) The information processing apparatus of (17), further comprising: a communication interface, wherein the processor is configured to control the communication interface to acquire third data from destination based on link information corresponding to a selected one of the plurality of graphic indicia.

(19) A method performed by an information processing apparatus, the method comprising: acquiring first data from a first server connected to the information processing apparatus via a network; generating a first menu based on the first data; controlling a display to display the first menu; acquiring second data from a second server connected to the information processing apparatus via a network based on a received input corresponding to the first menu; generating a second menu based on the second data; and controlling the display to display the second menu.

(20) A non-transitory computer-readable medium including computer program instructions, which when executed by an information processing apparatus, cause the information processing apparatus to perform a method comprising: acquiring first data from a first server connected to the information processing apparatus via a network; generating a first menu based on the first data; controlling a display to display the first menu; acquiring second data from a second server connected to the information processing apparatus via a network based on a received input corresponding to the first menu; generating a second menu based on the second data; and controlling the display to display the second menu.

What is claimed is:

1. An information processing apparatus comprising:
    circuitry configured to
        acquire first data from a first server connected to the information processing apparatus via a network;
        generate a first menu including at least a first icon image based on the first data;
        control a display to display the first menu;
        receive one of a first type of input or a second type of input corresponding to the first icon image;
        acquire, from a second server connected to the information processing apparatus via a network, second data when the received input is the first type of input and third data when the received input is the second type of input, the third data being different from the first data;
        generate a second menu based on the second data or the third data; and
        control the display to display the second menu.

2. The information processing apparatus of claim 1, further comprising:
    a communication interface connected to the display, wherein the circuitry is configured to control the display to display the first and second menus by transmitting the first and second menus to the display.

3. The information processing apparatus of claim 1, further comprising:
    the display, wherein the circuitry is configured to control the display to display the first and second menus.

4. The information processing apparatus of claim 1, wherein
    the first and second menus each include a plurality of icons arranged in horizontal and vertical directions.

5. The information processing apparatus of claim 1, further comprising:
    a memory that stores address information corresponding to the first server.

6. The information processing apparatus of claim 5, wherein
    the circuitry is configured to acquire the first data from the first server based on the address information corresponding to the first server stored at the memory.

7. The information processing apparatus of claim 1, wherein
    the first data acquired from the first server includes address information corresponding to the second server.

8. The information processing apparatus of claim 7, wherein
    the circuitry is configured to acquire the second data or the third data from the second server based on the address information corresponding to the second server acquired from the first server.

9. The information processing apparatus of claim 1, wherein
    the first data acquired from the first server includes address information corresponding to a second icon image stored at the second server.

10. The information processing apparatus of claim 9, wherein the circuitry is configured to:
    acquire the second icon image stored at the second server based on the address information corresponding to the icon image; and
    generate the second menu based on the acquired second icon image.

11. The information processing apparatus of claim 1, wherein
    the first data acquired from the first server includes the icon image and address information associated with the icon image.

12. The information processing apparatus of claim 11, wherein
    the first type of input corresponds to a selection of the icon image on the display, and
    the second type of input corresponds to a focus operation on the icon image on the display.

13. The information processing apparatus of claim 12, wherein
    the circuitry is configured to acquire the second or third data from the second server based on the type of received input and the address information associated with the icon image.

14. The information processing apparatus of claim 13, wherein
    the address information associated with the icon image corresponds to at least one of music data, still image data, moving image data and text data.

15. The information processing apparatus of claim 13, wherein
    the circuitry is configured to generate the second menu based on the second or third data associated with the icon image that corresponds to the address information associated with the icon image.

16. The information processing apparatus of claim 14, wherein
the circuitry is configured to generate the second menu by including the at least one of the music data, still image data, moving image data and text data in the second menu.

17. The information processing apparatus of claim 1, wherein
the second menu includes a plurality of graphic indicia and link information is associated with each of the plurality of graphic indicia.

18. The information processing apparatus of claim 17, further comprising:
a communication interface, wherein the circuitry is configured to control the communication interface to acquire fourth data from a destination based on link information corresponding to a selected one of the plurality of graphic indicia.

19. A method performed by an information processing apparatus, the method comprising:
acquiring first data from a first server connected to the information processing apparatus via a network;
generating a first menu including at least a first icon image based on the first data;
controlling a display to display the first menu;
receiving one of a first type of input or a second type of input corresponding to the first icon image;
acquiring, from a second server connected to the information processing apparatus via a network, second data when the received input is the first type of input and third data when the received input is the second type of input, the third data being different from the first data;
generating a second menu based on the second data or the third data; and
controlling the display to display the second menu.

20. A non-transitory computer-readable medium including computer program instructions, which when executed by an information processing apparatus, cause the information processing apparatus to perform a method comprising:
acquiring first data from a first server connected to the information processing apparatus via a network;
generating a first menu including at least a first icon image based on the first data;
controlling a display to display the first menu;
receiving one of a first type of input or a second type of input corresponding to the first icon image;
acquiring, from a second server connected to the information processing apparatus via a network, second data when the received input is the first type of input and third data when the received input is the second type of input, the third data being different from the first data;
generating a second menu based on the second data or the third data; and
controlling the display to display the second menu.

* * * * *